United States Patent [19]
Wilt

[11] Patent Number: 6,038,352
[45] Date of Patent: Mar. 14, 2000

[54] TWO-BIT MORPHOLOGY PROCESSING APPARATUS AND METHOD

[75] Inventor: Michael J. Wilt, Windham, N.H.

[73] Assignee: Acuity Imaging, LLC, Nashua, N.H.

[21] Appl. No.: 09/026,053

[22] Filed: Feb. 19, 1998

Related U.S. Application Data

[63] Continuation-in-part of application No. 08/953,772, Oct. 17, 1997
[60] Provisional application No. 60/066,343, Nov. 21, 1997.

[51] Int. Cl.[7] .................................................. G06K 9/56
[52] U.S. Cl. ........................... 382/308; 382/303; 382/304
[58] Field of Search .................................. 382/302, 303, 382/304, 307, 308, 282, 283

[56] References Cited

U.S. PATENT DOCUMENTS

| | | | |
|---|---|---|---|
| 4,685,144 | 8/1987 | McCubberey et al. | 382/308 |
| 4,791,675 | 12/1988 | Deering et al. | 382/308 |
| 4,797,806 | 1/1989 | Krich | 382/308 |
| 5,657,403 | 8/1997 | Wolff et al. | 382/308 |

*Primary Examiner*—Amelia Au
*Assistant Examiner*—Jingge Wu
*Attorney, Agent, or Firm*—Bourque & Associates, P.A.

[57] ABSTRACT

The present invention provides a novel system and method that permits a "mask" to be directly incorporated into an image during image processing. This is accomplished by processing binary images or image data which are encoded using two bits rather than the usual one. The second bit is defined to be a "mask enable", which directs a processor to pass the original data through to the output image regardless of the processing result for that pixel. The present invention also provides a means of automatically providing background data to the processor for pixels outside the original image so that the result image is always the same size as the original image. For binary images, the background may be defined to have a value of "0" or "1", and this value is provided to the processing engine in place of all of the pixels which lie outside the original image. For gray-scale images, the minimum or maximum possible value is provided to the processing engine in place of all of the pixels which lie outside of the original image, effectively eliminating these values from consideration when the minimum or maximum of the neighborhood pixels is computed. The determination of whether a pixel is outside of the original image is implemented using the framing signals provided by a data flow controller along with the image data.

12 Claims, 5 Drawing Sheets

TWO-BIT MORPHOLOGY PROCESSING APPARATUS AND METHOD

RELATED APPLICATION

This application is a continuation-in-part of commonly owned, co-pending U.S. patent application Ser. No. 08/953,772 filed Oct. 17, 1997 also claims the benefit of U.S. Provisional No. 60/066,343, filed Nov. 21, 1997, which is fully incorporated herein by reference.

FIELD OF THE INVENTION

This invention relates generally to image processing systems and more particularly, to processing apparatus for such systems.

BACKGROUND OF THE INVENTION

Morphology processing as it is applied to image processing and machine vision usually involves replacing each pixel in an image or image section being processed with a function of itself and its neighbor pixels.

The most useful functions are non-linear. Accordingly, a preferred technique that is well known in the art is to represent the function as a look-up table. The look-up table is indexed by a numerical value formed by concatenating all the pixel values found in a neighborhood together. For example, a morphology processing engine for 3×3 neighborhoods of binary pixel values needs to have an index value containing 9 bits, corresponding to a look-up table containing 512 different possible values. By setting the values in this look-up table, it is possible to choose an output value for each of the 512 possible input neighborhoods.

Iterative processing using different functions is an especially powerful technique. This sort of processing engine may be used to implement convex hull, various skeleton operators, operators that remove spatial noise, and many other operators which are useful for image processing and machine vision.[1]

[1] Haralick, Robert M. and Shapiro, Linda G. "Computer and Robot Vision, Volume I", Addison-Wesley, 1992.

Morphology processing is also applicable to gray-scale images, where each image pixel is represented by an intensity value. Most image processing and machine vision systems represent image intensity values using between 6 and 16-bit quantities. Implementing the morphology neighborhood functions using look-up tables is prohibitively expensive for these images, but several non-linear operators such as minimum and maximum may be implemented economically using appropriate processing hardware.

Used in conjunction with image arithmetic operations, morphology processing becomes even more useful. Image arithmetic may be used to implement a mask determining which pixels are to be processed. It may also be used to compare images with and without morphology processing, or images which have been subject to different processing steps.

One of the primary difficulties associated with morphology and other neighborhood-based processing is the fact that the processing function is only fully defined for pixels that have a complete complement of neighbors. Pixels that are adjacent to the boundary of the image have a number of neighbors which are outside of the image. The usual method of dealing with this problem is to produce a result image that is smaller than the original image. The original image must contain a quiet zone of background data surrounding the subject data to be processed.

SUMMARY OF THE INVENTION

The invention provides two specific improvements over existing apparatus and methods for performing morphology processing. First, the present invention provides a novel mechanism that permits a "mask" to be directly incorporated into the image.

Second, the present invention provides a means of automatically providing background data to the processing engine for pixels outside the original image so that the result image is always the same size as the original image.

These and other improvements are implemented in an improved processor for performing morphology computations on one or more adjacent pixels. The improved morphology processor includes a data flow controller, which provides pixel data in groups of adjacent pixels and provides framing signals. The morphology processor also includes a neighborhood generator, which receives the pixel data and framing signals from the data flow controller and which generates neighborhood data and corresponding neighborhood pixel-valid signals. Also included is one or more neighborhood processor, which receives the neighborhood data along with the corresponding pixel-valid signals and which automatically inserts background data for processing in place of invalid neighborhood pixels.

This invention incorporates a mask into a binary image by processing binary images or image data which are encoded using two bits rather than the usual one. The second bit is defined to be a "mask enable" data bit, which directs the processing machinery (processing "engine") to pass the original data through to the output image regardless of the processing result for that pixel. This invention is particularly useful because the masked pixel data is permitted to participate in the computation of all of its neighboring pixels' results. This permits the use of "always 0" and "always 1" values in addition to the usual "0" and "1" values.

The invention also facilitates the morphology processing of both binary and gray-scale images by providing automatic background generation. For binary images, the background may be defined to have a value of "0" or "1". This value is provided to the processing engine in place of all of the pixels which lie outside the original image. For gray-scale images, the minimum or maximum possible value is provided to the processing engine in place of all of the pixels which lie outside of the original image, effectively eliminating these values from consideration when the minimum or maximum of the neighborhood pixels is computed. The determination of whether a pixel is outside of the original image is implemented using the framing signals provided by the data flow controller along with the image data.

For example, when a "start of row" signal is asserted, the left-most pixel to be processed is known to be on the left boundary of the incoming image data. In this case, the neighborhood pixels to the left of this left-most pixel are outside the original image and the background value is provided to the processing engine for these neighborhood pixel values.

DESCRIPTION OF THE PREFERRED EMBODIMENT

Figure 1:
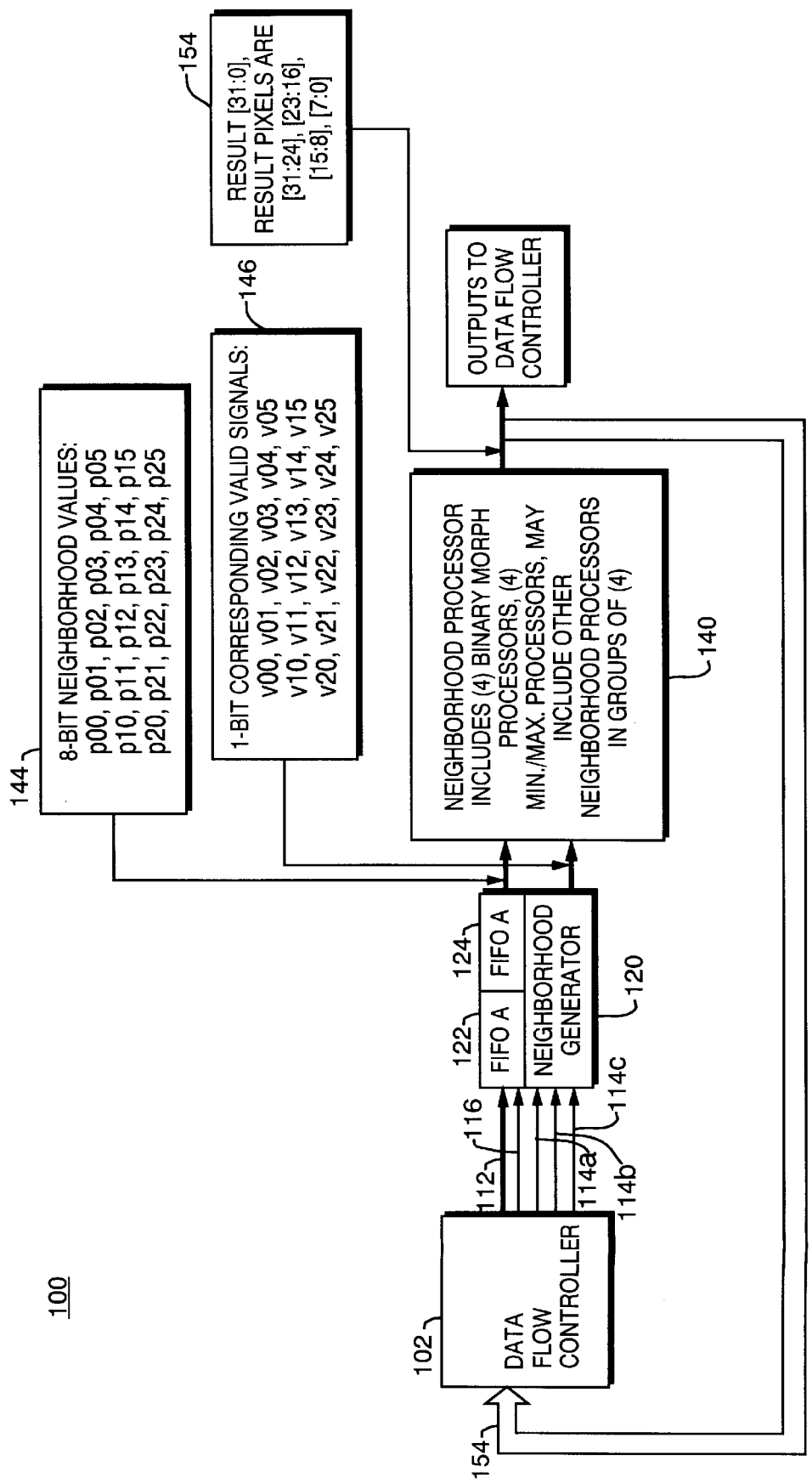
FIG. 1 is a schematic diagram which shows the relationship between the data flow controller, the neighborhood generator, and the neighborhood processor.

The improved morphology processor 100, FIG. 1, which is the subject of this invention, is preferably implemented as a digital circuit within a larger image processing integrated circuit, although this is not a limitation of the present invention.

A data flow controller 102 (described as alignment unit (50) in co-pending application Ser. No. 08/953,742) provides pixel data 112 in groups of four adjacent pixels, along with framing signals 114 including start-of-row signal 114a, end-of-row signal 114b, and end-of-frame signal 114c. The groups of four adjacent pixels include four (4) eight-bit wide pixels [31:24], [23:16], [15:8] and [7:0], which together form a single 32 bit wide memory word [31:0]. The data flow controller 102 also provides input pixel valid signals [3:0] 116 corresponding to the four adjacent input pixels. However, even absent input pixel valid signals, the improved morphology processor of the present invention generates valid signals using neighborhood generator 120.

The neighborhood generator internally recycles the image data 112 through first and second row FIFO (first-in, first-out) memories 122 and 124. The valid signals are determined as follows:

When the first row of data arrives at the neighborhood generator 120 from the data flow controller 102, the data enters the "bottom" row of the neighborhood. Therefore, only pixels in the bottom row of the neighborhood) pixels labeled as p20, p21, p22, p23, p24, p25) are valid. When the end of the first row is signaled, valid data from the first row starts coming out of the first row FIFO 122 and enters the "middle" row of the neighborhood as the second row arrives. Thus, neighborhood pixels in the middle row (labeled as pixels p10, p11, p12, p13, p14, p15) are now valid. When the end of the second row is signaled, valid data from the second row FIFO 124 enters the "top" row of the neighborhood as the third row arrives. Thus, neighborhood pixels in the top row, (labeled as pixels p00, p01, p02, p03, p04, p05) are now valid. Starting with the third row, all rows of the neighborhood are valid until the last row is signaled by an end-of-frame signal.

After the last row, the neighborhood generator 120 continues to run for one more row, but pixels in the bottom row of the neighborhood p20, p21, p22, p23, p24, p25 are not valid because no new data is arriving. At the beginning of each row, the left-most group of neighborhood pixels p00, p10, p20 are invalid. At the end of each row, the rightmost group of neighborhood pixels p05, p15, p25 are invalid.

The net result of this logic is that the neighborhood generator 120 runs for one additional row-time after the image finishes arriving, and pixels in the "middle" row of the neighborhood are valid starting when the second row of image data arrives from the data flow controller 100.

The neighborhood processor 140 runs whenever pixels in the middle row of the neighborhood are valid. Thus, the first row of results is generated as the second row of data arrives. The pixel valid signals are synchronized with the neighborhood pixel data at all times and are used by the processing units to insert background data in place of invalid neighborhood pixel values.

Figure 2A:
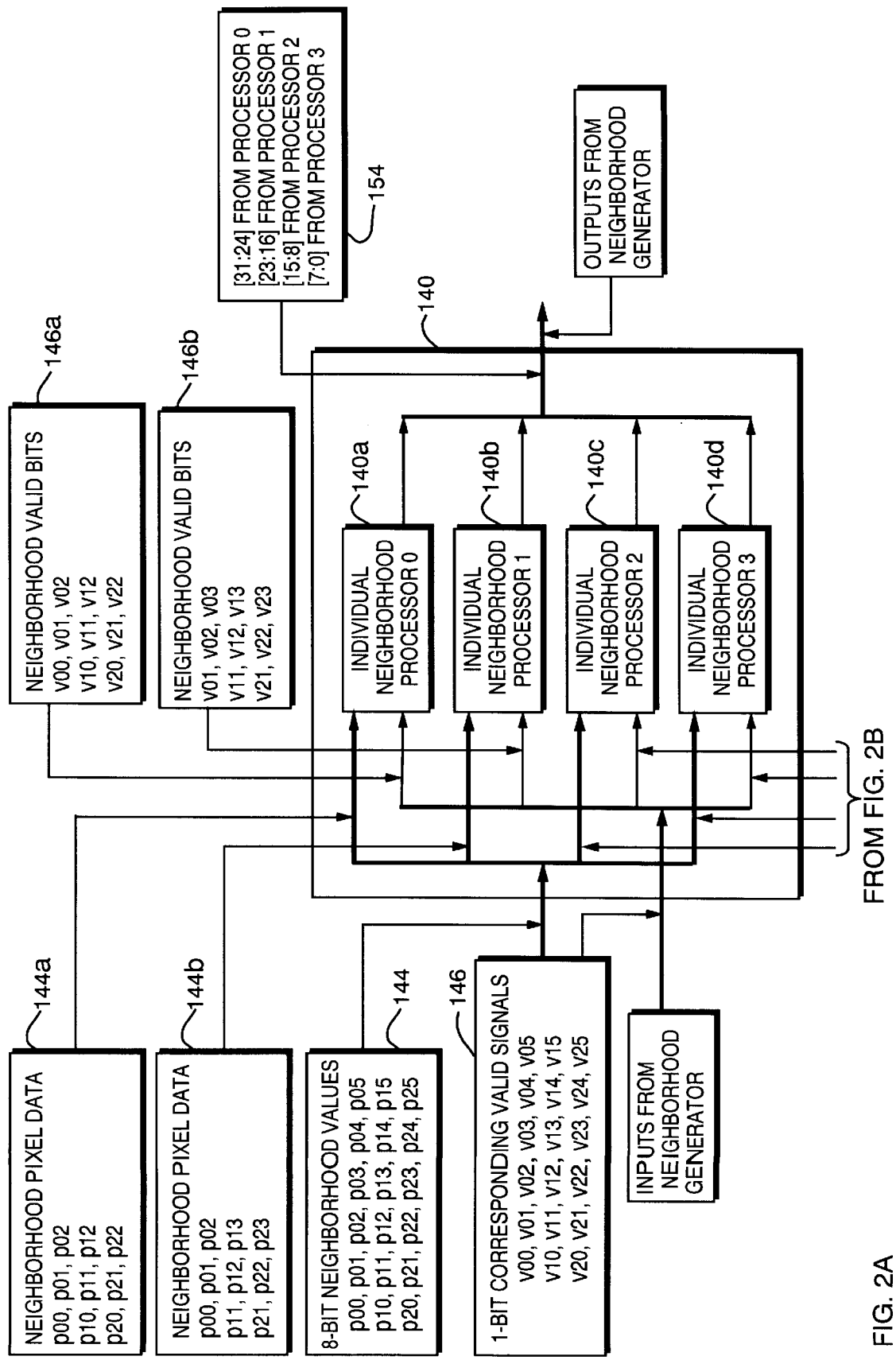
FIG. 2 is a more detailed schematic diagram which illustrates the internal organization of the neighborhood processor according to the present invention.
Figure 2B:
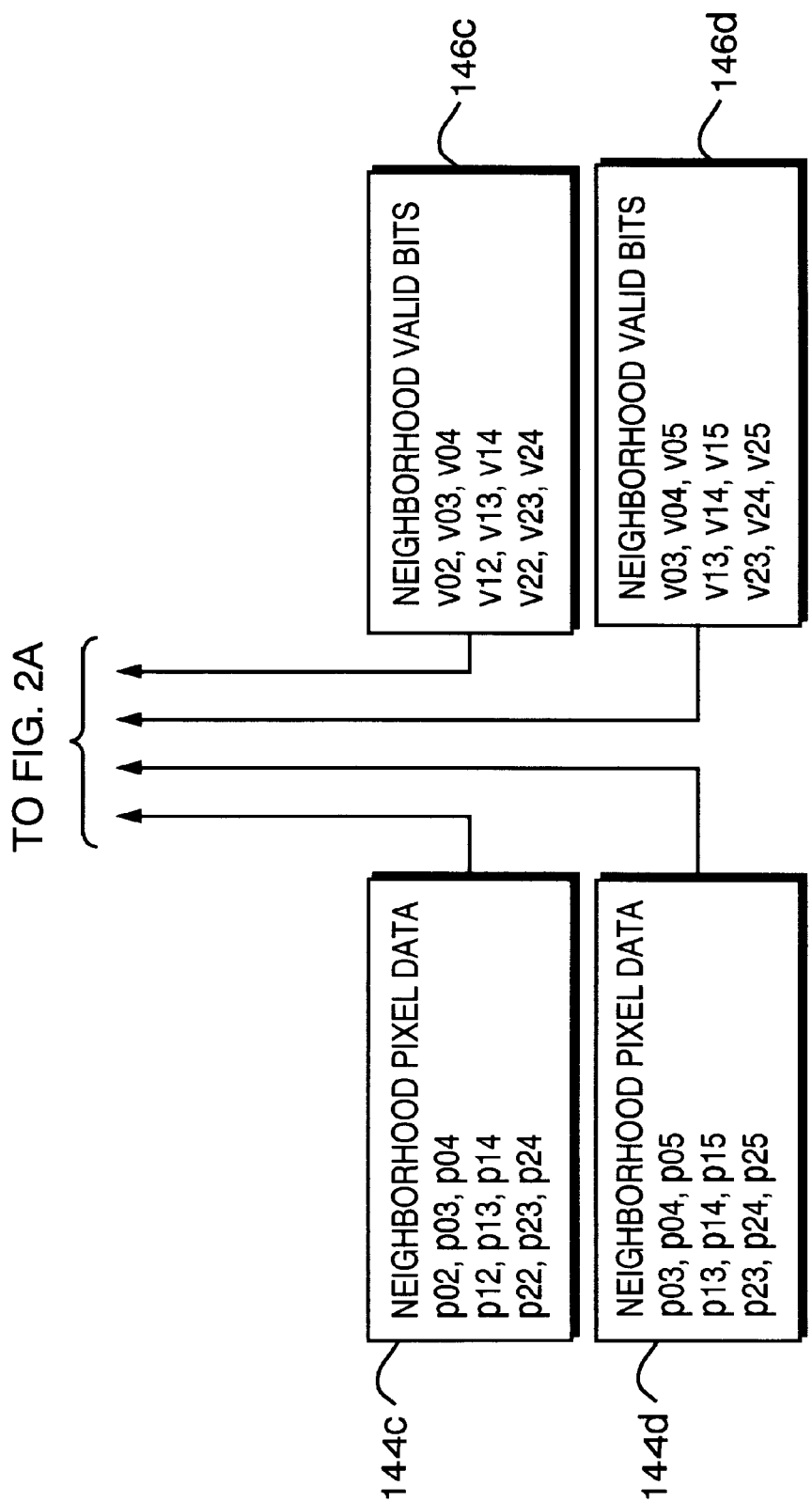

Turning now to FIG. 2, one preferred embodiment of the neighborhood processor 140 is shown, which includes four individual neighborhood processors 140a–140d. This embodiment allows for the simultaneous processing of four individual pixel neighborhoods. In this embodiment, the 8-bit neighborhood values generated by neighborhood generator 120, FIG. 1, (p00, p01, p02, p03, p04, p05; p10, p11, p12, p13, p14, p15; and p20, p21, p22, p23, p24, p25) (commonly indicated by data line 144) along with their corresponding pixel valid signals (v00, v01, v02, v03, v04, v05; v10, v11, v12, v13, v14, v15; and v20, v21, v22, v23, v24, v25) (commonly indicated by data line 146) are input into the neighborhood processor 140. Each individual 3×3 pixel neighborhood included therein is individually processed by one of the four individual neighborhood processors.

For example, a first 3×3 neighborhood of pixel data including top, middle and bottom rows of pixel data for pixels p00, p01, p02; p10, p11, p12; and p20, p21, p22, respectively, 144a is processed by neighborhood processor 0, 140a. Individual neighborhood processor 0 140a also receives neighborhood pixel valid signals (v00, v01, v02; v10, v11, v12; and v20, v21, v22) 146a from neighborhood generator 120 of FIG. 1, which it uses to determine when to use background data in place of invalid neighborhood pixel values in a computation. Similarly, the remaining three neighborhoods of pixel data 144b–d and their corresponding pixel valid signals 146b–d are processed by the other three individual neighborhood processors 1–3 140b–d. Thus, the output 154 from the neighborhood processors 140 will be four groups of four adjacent pixels including pixels [31:24], [23:16], [15:3] and [7:0], which, in the same way as the original output from the data flow controller 100 of FIG. 1, form a 32 bit wide memory word [31:0] 154. This processed memory word 154 is then output back to the data flow controller 102 for further vision system processing and/or storage.

Figure 3:
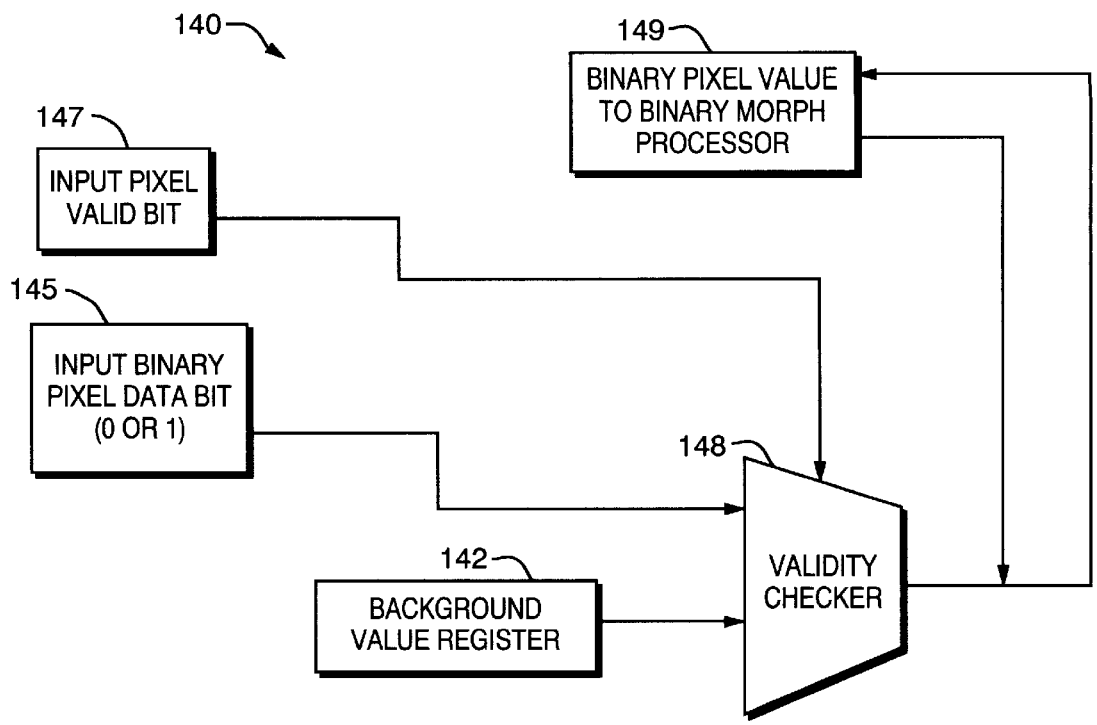
FIG. 3 is a block diagram which shows how the background value is inserted for processing for binary images according to one feature of the present invention.

As is more clearly illustrated in FIG. 3, for binary morphology processing, background values for pixel data are stored in a background value register 142 in the neighborhood processor 140. The neighborhood processor also includes a validity checker 148 which, in the preferred embodiment, is implemented as a multiplexer. When the validity checker 148 receives an input binary pixel data bit 145 (which, by definition, is either a 0 or 1) it checks the valid pixel bit 147 corresponding to the input binary pixel.

If the pixel valid bit is a 1, which indicates that the input pixel is valid, the processor forwards the input binary pixel value to the binary morphology processor for morphology processing as a binary pixel output value 149. On the other hand, if the validity checker 148 sees a pixel valid bit 147 equal to 0, which indicates an invalid pixel, the validity checker 148 retrieves the background value for the invalid neighborhood pixel values from background value register 142 and uses those values in the binary morphology processing computations.

For gray-scale minimum/maximum processing, the background value is chosen such that it will not contribute to the result. For example, when performing a "min" operation, the background value is set to the maximum possible value thus insuring that one of the valid pixels will be chosen as the minimum value result.

Figure 4:
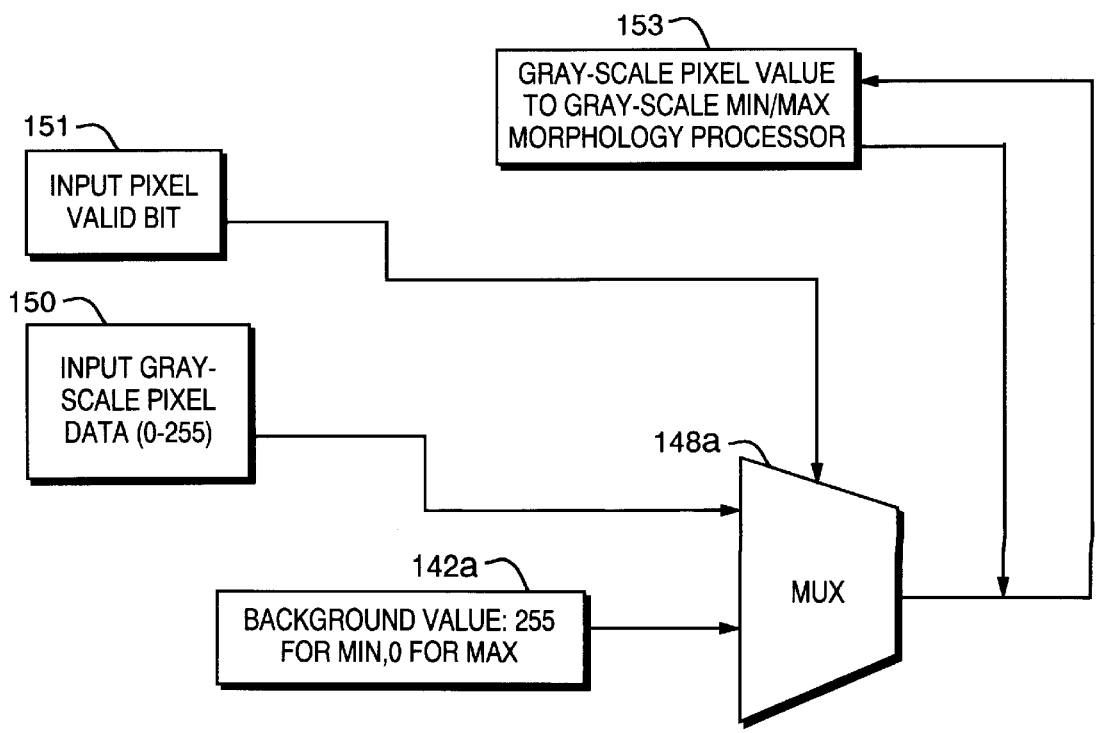
FIG. 4 is a block diagram which illustrates how the background value is inserted for processing for gray-scale images in accordance with the present invention.

FIG. 4 illustrates a preferred embodiment of a gray scale morphology processor which includes a background value register 142a which includes a background value of 255 for minimum and a value of 0 for maximum. In this embodiment, input gray-scale pixel data 150 comprises input gray scale pixel data which has a value range of between 0 and 255. Upon receipt of such input pixel data, validity checker 148a (implemented in the preferred embodiment as a multiplexer) checks the input pixel valid bit(s) 151 corresponding to the input pixel data 150. If the pixel valid bit is a 1, which indicates that the input pixel is valid, the multiplexer 148 forwards the input gray scale pixel data value 150 to the gray scale morphology processor as gray scale pixel value 153. If the pixel valid bit is a 0, which indicates that the input pixel is not valid, the multiplexer 148 forwards the background value 142a to the gray scale morphology processor as gray scale pixel value 153.

Figure 5:
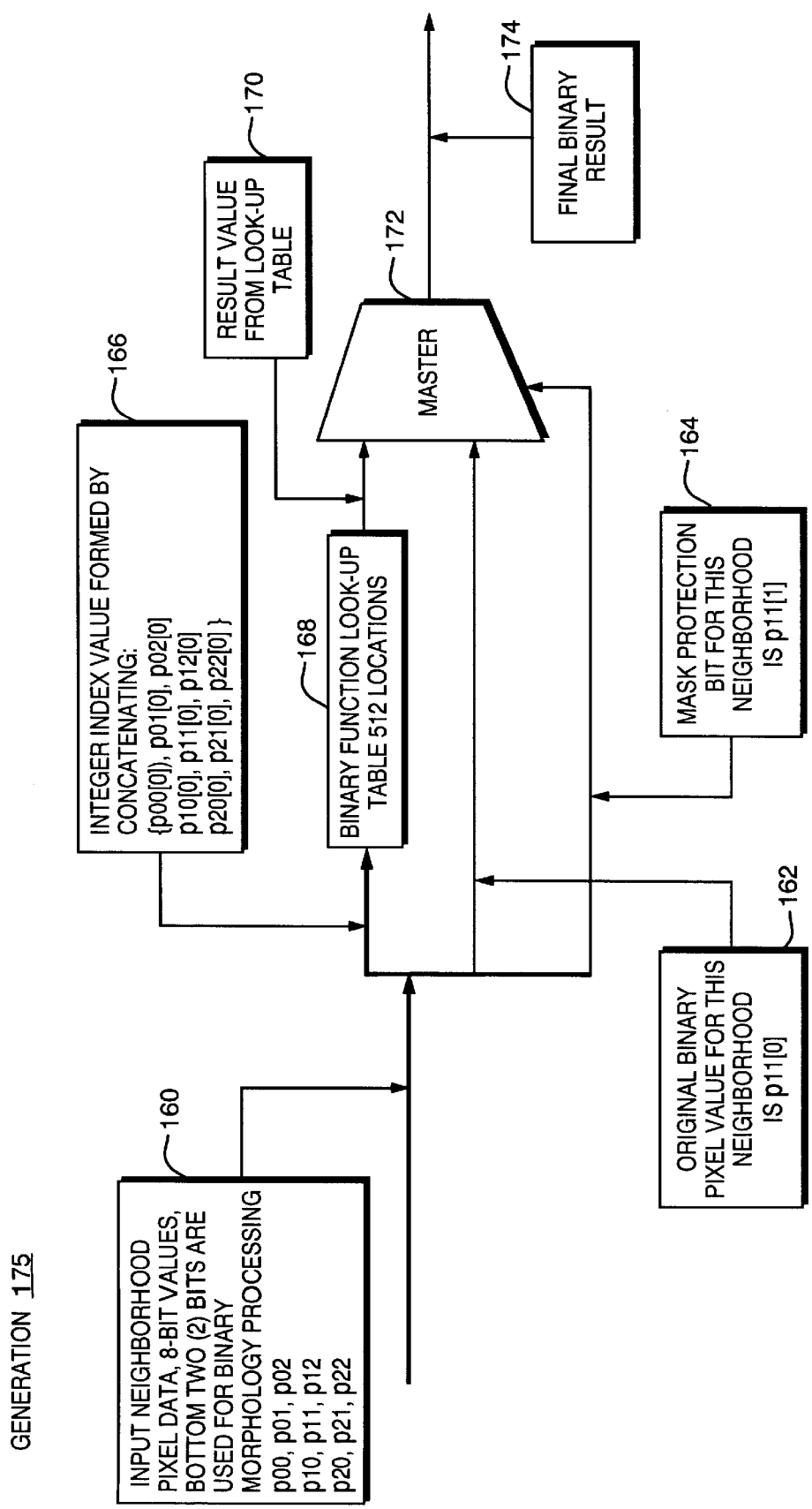
FIG. 5 is a block diagram showing an implementation of the integral mask for binary morphology according to the present invention.

The system also includes a binary morphology embedded mask implementation 175, which is shown in FIG. 5. When performing binary morphology processing, the input neighborhood pixel data 160 may include 8-bit values, the bottom two bits of which are used for binary morphology processing. The first of the two bottom bits 162 contains the binary image value for a particular neighborhood. The second of the two bottom bits 164 is a mask protection bit for its associated neighborhood, which may be set to "mask" or "protect" the neighborhood pixel value.

In the morphology processing operation, an integer index value 166 is formed by concatenating the input neighborhood data (p00[0], p01[0], p02[0], p10[0], p11[0], p12[0], p20[0], p21[0], p22[0]). The thus formed integer index value 166 is then input into a binary function look-up table 168 having 512 locations. Based on the input integer index value, a result value 170 is retrieved from the look-up table 168 and is sent to masker 172. The masker 172 then inspects the mask protection bit 164 for the neighborhood being processed. The mask protection bit 164 may be either a 0, which indicates that the mask is disabled (not set), or a 1, which indicates that the neighborhood is to be "masked" during the binary morphology operation.

If the mask protection bit is not set (i.e.=0), then the image value bit participates in the computation of morphology results through the binary function look-up table and the masker outputs a final binary result 174 equal to the result value 170 retrieved from the look-up table 168. On the other hand, when the mask protection bit is set (i.e. =1), the masker 172 copies the original binary pixel value for the neighborhood 162 as the final binary result 174 regardless of the result of the neighborhood function computation.

Accordingly, the present invention provides a useful and novel morphology system and method for performing morphology processing on data such as image data.

Modifications and substitutions by one of ordinary skill in the art are considered to be within the scope of the present invention which is not to be limited except by the claims which follow.

What is claimed is:

1. An improved system for performing binary morphology computations on one or more adjacent image pixels comprising:
   a data flow controller for providing image data in groups of adjacent image pixels, said image data including at least two bits per pixel, a first bit of which contains a binary image value and a second bit of which contains a mask protection bit;
   a neighborhood generator, which receives said image data and said framing signals and which generates neighborhood data; and
   a neighborhood processor, for receiving neighborhood pixel data corresponding to a neighborhood of pixels in an image being processed, wherein said neighborhood pixel data is represented using at least first and second bits for each of said pixels, and wherein said first bit is an original binary pixel value and said second bit is a mask protection bit for protecting said original binary pixel value, and for outputting a final binary result, wherein said final binary result is said original binary pixel value for said neighborhood of pixels if said mask protection bit for said neighborhood of pixels is set to protect said original pixel value, and wherein said final binary result is a result value from a binary function look-up table if said mask protection bit for said neighborhood of pixels is not set to protect said original pixel value.

2. A method for performing morphology computations on one or more adjacent pixels, said method comprising the steps of:
   providing, from a data flow controller, image data in groups of adjacent pixels and framing signals including start-of-row, end-of-row and end-of-frame signals to a neighborhood generator, said image data including at least two bits per pixel, at least one bit of which contains a binary image value and at least one bit of which contains a mask bit;
   receiving, by said neighborhood generator, said image data and said framing signals and generating neighborhood data signals; and
   interpreting said image data and replacing the result of a processing computation with a copy of said binary image value bit if said mask bit so dictates, regardless of the result of said processing computation, said step of interpreting said image data comprising:
      receiving said neighborhood data including said binary image value and said mask bit for each pixel in a neighborhood of pixels;
      forming an integer index value corresponding to said neighborhood of pixels by concatenating said neighborhood pixel data;
      retrieving a result value from a binary function look-up table based upon said integer index value; and
      outputting a final binary result, wherein said final binary result is an original binary pixel value for said neighborhood of pixels if said mask protection bit for said neighborhood of pixels is set to protect said original binary pixel value, and wherein said final binary result is said result value from said binary function look-up table if said mask protection bit for said neighborhood of pixels is not set to protect said original binary pixel value.

3. The method of claim 2 wherein said neighborhood generator generates neighborhood data and corresponding neighborhood pixel-valid signals.

4. The method of claim 2 wherein said step of generating neighborhood data and corresponding neighborhood pixel-valid signal comprises recycling said image data through at least one two-row FIFO (First-In, First-Out) memory.

5. A system for performing binary morphology processing using a mask protection bit, said system comprising:
   a neighborhood processor, for receiving neighborhood pixel data corresponding to a neighborhood of pixels in an image being processed, wherein said neighborhood pixel data is represented using at least first and second bits for each of said pixels, and wherein said first bit is an original binary pixel value and said second bit is a mask protection bit for protecting said original binary pixel value, and for outputting a final binary result, wherein said final binary result is said original binary pixel value for said neighborhood of pixels if said mask protection bit for said neighborhood of pixels is set to protect said original pixel value, and wherein said final binary result is a result value if said mask protection bit for said neighborhood of pixels is not set to protect said original pixel value.

6. The system of claim 5 further including a neighborhood generator, which receives said image pixel data and framing signals and which generates neighborhood data and corresponding neighborhood pixel-valid signals.

7. The system of claim 6 wherein said neighborhood generator comprises at least two FIFO (First In, First Out) memories through which said image pixel data is cycled.

8. An improved system for performing binary morphology computations on one or more adjacent image pixels comprising:

a data flow controller for providing image data in groups of adjacent image pixels, said image data including at least two bits per pixel, a first bit of which contains a binary image value and a second bit of which contains a mask bit, said data flow controller for also providing framing signals;

a neighborhood generator, comprising at least two FIFO (First-In, First-Out) memories, which receives said image data and framing signals and which generates neighborhood data and corresponding neighborhood pixel-valid signals; and a neighborhood processor, for receiving neighborhood pixel data corresponding to a neighborhood of pixels in an image being processed, wherein said neighborhood pixel data is represented using at least first and second bits for each of said pixels, and wherein said first bit is an original binary pixel value and said second bit is a mask protection bit for protecting said original binary pixel value, and for outputting a final binary result, wherein said final binary result is said original binary pixel value for said neighborhood of pixels if said mask protection bit for said neighborhood of pixels is set to protect said original pixel value, and wherein said final binary result is a result value from a binary function look-up table if said mask protection bit for said neighborhood of pixels is not set to protect said original pixel value.

9. The system of claim 8 wherein said at least one binary neighborhood processor comprises:

means for receiving said neighborhood data including said binary image value and said mask bit for each pixel in a neighborhood of pixels;

means for forming an integer index value corresponding to said neighborhood of pixels by concatenating said neighborhood pixel data;

means for retrieving a result value from a binary function look-up table based upon said integer index value; and means for outputting a final binary result, wherein said final binary result is an original binary pixel value for said neighborhood of pixels if said mask protection bit for said neighborhood of pixels is set to protect said original binary pixel value, and wherein said final binary result is said result value from said binary function look-up table if said mask protection bit for said neighborhood of pixels is not set to protect said original binary pixel value.

10. A binary neighborhood processor for performing binary morphology processing on neighborhood pixel data using a mask protection bit, said binary neighborhood processor comprising:

means for receiving said neighborhood data including an original binary pixel value and said mask protection bit for each pixel in a neighborhood of pixels;

means for forming an integer index value corresponding to said neighborhood of pixels by concatenating said neighborhood pixel data;

means for retrieving a result value from a binary function look-up table based upon said integer index value; and means for outputting a final binary result, wherein said final binary result is an original binary pixel value for said neighborhood of pixels if said mask protection bit for said neighborhood of pixels is set to protect said original binary pixel value, and wherein said final binary result is said result value if said mask protection bit for said neighborhood of pixels is not set to protect said original binary pixel value.

11. A method of performing binary morphology processing using an embedded mask, said method comprising the steps of:

receiving neighborhood pixel data corresponding to a neighborhood of pixels in an image being processed, wherein said neighborhood pixel data is represented using at least first and second bits for each of said pixels, and wherein said first bit is a binary pixel value and said second bit is a mask protection bit for protecting said binary pixel value;

forming an integer index value corresponding to said neighborhood of pixels by concatenating said neighborhood pixel data;

retrieving a result value from a binary function look-up table based upon said integer index value; and outputting a final binary result, wherein said final binary result is an original binary pixel value for said neighborhood of pixels if said mask protection bit for said neighborhood of pixels is set to protect said original pixel value, and wherein said final binary result is said result value from said binary function look-up table if said mask protection bit for said neighborhood of pixels is not set to protect said original pixel value.

12. A method of performing binary morphology processing using an embedded mask, said method comprising the steps of:

receiving neighborhood pixel data corresponding to a neighborhood of pixels in an image being processed, wherein said neighborhood pixel data is represented using at least first and second bits for each of said pixels, and wherein said first bit is a binary pixel value and said second bit is a mask protection bit for protecting said binary pixel value;

computing a result value based on said neighborhood pixel data; and outputting a final binary result, wherein said final binary result is an original binary pixel value for said neighborhood of pixels if said mask protection bit for said neighborhood of pixels is set to protect said original pixel value, and wherein said final binary result is said result value if said mask protection bit for said neighborhood of pixels is not set to protect said original pixel value.

* * * * *